(12) United States Patent
Kirk et al.

(10) Patent No.: US 9,317,556 B2
(45) Date of Patent: Apr. 19, 2016

(54) ACCELERATING DATABASE QUERIES CONTAINING BITMAP-BASED CONDITIONS

(75) Inventors: Steven A. Kirk, Chelmsford, MA (US); David E. Walrath, Stow, MA (US)

(73) Assignee: SYBASE. INC., Dublin, CA (US)

( * ) Notice: Subject to any disclaimer, the term of this patent is extended or adjusted under 35 U.S.C. 154(b) by 399 days.

(21) Appl. No.: 12/892,312

(22) Filed: Sep. 28, 2010

(65) Prior Publication Data

US 2012/0078880 A1    Mar. 29, 2012

(51) Int. Cl.
G06F 7/00 (2006.01)
G06F 17/00 (2006.01)
G06F 17/30 (2006.01)

(52) U.S. Cl.
CPC .... *G06F 17/30498* (2013.01); *G06F 17/30324* (2013.01)

(58) Field of Classification Search
CPC .............. G06F 17/30324; G06F 17/30498; G06F 17/2785; G06F 17/3056; G06F 17/30306; G06F 17/30474
USPC .............................. 707/1, 713, 737, 715, 717
See application file for complete search history.

(56) References Cited

U.S. PATENT DOCUMENTS

| 5,706,495 | A | * | 1/1998 | Chadha et al. | |
| 5,799,300 | A | * | 8/1998 | Agrawal et al. | |
| 5,852,821 | A | * | 12/1998 | Chen et al. | |
| 5,924,091 | A | * | 7/1999 | Burkhard | |
| 5,925,100 | A | * | 7/1999 | Drewry et al. | 709/219 |
| 6,141,656 | A | * | 10/2000 | Ozbutun et al. | |
| 6,460,026 | B1 | * | 10/2002 | Pasumansky | 707/737 |
| 6,615,206 | B1 | * | 9/2003 | Jakobsson et al. | |
| 7,188,266 | B1 | * | 3/2007 | Mendel et al. | 713/320 |
| 7,716,210 | B2 | * | 5/2010 | Ozcan et al. | 707/713 |
| 2010/0169381 | A1 | * | 7/2010 | Faunce et al. | 707/797 |

* cited by examiner

*Primary Examiner* — Susan Chen
(74) *Attorney, Agent, or Firm* — Sterne, Kessler, Goldstein & Fox P.L.L.C.

(57) ABSTRACT

Systems, methods and articles of manufacture for accelerating database queries containing bitmap-based conditions are described herein. An embodiment includes determining a bitmap, where the bitmap represents a set of rows that have satisfied one or more conjunctive conditions which preceded a conjunct that is a disjunction in a query expression and restricting evaluation of a disjunct within the disjunction to the set of rows represented by the bitmap. Another embodiment includes determining a satisfaction bitmap, where the bitmap represents the result of one or more preceding disjuncts in a disjunction within a query expression and restricting scope of evaluation of a disjunct to a set of rows that are not within the determined satisfaction bitmap. In this way, embodiments of the present invention enable the acceleration of queries containing disjunctions of conditions on a database table, as well as reduce the temporary resources consumed for such queries.

14 Claims, 6 Drawing Sheets

ACCELERATING DATABASE QUERIES CONTAINING BITMAP-BASED CONDITIONS

BACKGROUND

1. Field

Embodiments of the present invention relate generally to databases and, more particularly, to accelerating database queries.

2. Background Art

Databases commonly organize data in the form of tables, each table having a number of rows and columns. Each row in a table generally has a data value associated with each of the columns, this intersection of rows and columns commonly called a cell. A system needing access to data in the database typically issues a request in the form of a query. A query usually involves a request for the data contained in one or more cells of any rows which satisfy a particular condition. This condition often involves the comparison of the values of cells in a column to some other value to determine whether the row associated with the compared cell satisfies the condition.

A direct comparison of each cell of interest in a table to a value is often computationally expensive, and database developers have accordingly introduced means by which rows satisfying a comparison operation can be more readily determined without the need to traverse every row of a table. A common optimization involves the use of a tree-based index structure to determine which rows contain a desired value. Each node of the tree represents a distinct value appearing within a particular column in any row of the table. Each node of the tree connects to a data structure representing the set of all rows in the table where the indexed column contains the specified distinct value. One such data structure that can be used to represent a set of rows is a bitmap, where each bit with a '1' value within the bitmap corresponds to a row containing the specified distinct value.

This approach is reasonably efficient when an exact value is desired, such as with, for example, a query for all rows in which a particular column has the string value "Sybase". In this approach, database software would traverse the tree structure to locate the node corresponding to the distinct string value "Sybase" and retrieve an associated bitmap. The rows for which the value of the particular column is "Sybase" would be represented by "set" bits in the bitmap (i.e., bits set to either a '1' or a '0' value in order to indicate that a corresponding row satisfies the condition or fails to satisfy it). As a result, the database software is able to simply retrieve those rows and produce a result set from them.

In recent years, among both database vendors and database scholars, there has been significant interest in the use of bitmap-based methods for the evaluation of a set of conditions. These sets of conditions can be combined using typical Boolean combining operators (e.g., AND, OR, and NOT), and these combinations can be arbitrarily nested within each other.

One example of such a combination of conditions, using SQL, is a WHERE clause expression that includes both conjunctive conditions (i.e., a set of conditions connected by one or more AND operators) and a set of disjunctive conditions (i.e., a set of conditions connected by one or more OR operators). The goal of a database optimizer when faced with a query containing such a WHERE clause is to determine the fastest way to identify a set of relevant rows in a table that satisfy conditions in the WHERE clause.

To process such expressions and index-based operations, conventional approaches may take the original or transformed complex condition expression, and render it into a tree of simple conditions (i.e., conditions which do not contain other conditions) and complex conditions (i.e., conditions containing one or more other conditions and one or more Boolean combining operators). Each simple condition may then be evaluated in isolation, and then the simple binary combining operators may be applied to each pair of results from lower level conditions in the tree.

Some existing databases extend the above outlined conventional Boolean combination method by enabling a simple condition, within a sequence of conjunctive conditions, to accept as an input a bitmap which represents the rows that have satisfied all the preceding conjunctive conditions. Other existing databases have extended their naïve Boolean combination method in an orthogonal direction by supporting n-ary OR and n-ary AND operations instead of restricting themselves to a tree of binary AND and OR operators. However, such conventional methods preclude many mechanisms that could potentially be used to determine and reduce the cost of evaluating simple conditions.

Accordingly, systems, method and computer program product embodiments are desired that overcome limitations of conventional approaches to accelerate database queries.

BRIEF SUMMARY

Embodiments of the present invention relate to accelerating database queries containing bitmap-based conditions. An embodiment includes determining a bitmap, where the bitmap represents a set of rows that have satisfied one or more conjunctive conditions which preceded a conjunct that is a disjunction in a query expression and restricting evaluation of a disjunct within the disjunction to the set of rows represented by the bitmap. Another embodiment includes determining a satisfaction bitmap, where the bitmap represents the result of one or more preceding disjuncts in a disjunction within a query expression and restricting scope of evaluation of a disjunct to a set of rows that are not within the determined satisfaction bitmap. The embodiments also include estimating a cost of evaluating a condition within a disjunction in order to estimate cost savings obtained by use of the determined bitmaps.

In this way, embodiments of the present invention enable acceleration of queries containing disjunctions of conditions on a database table, as well as reduce the temporary resources consumed for such queries.

Further embodiments, features, and advantages of the invention, as well as the structure and operation of the various embodiments of the invention are, described in detail below with reference to accompanying drawings.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The term "conjunction" refers to two or more conditions connected by AND operators. As a purely illustrative example, consider the expression:

$$t.x<10 \text{ AND } t.\text{priority}=\text{'high'} \text{ AND } t.\text{state}=\text{'NY'} \quad (1)$$

The term "conjunct" (or "conjunctive condition") refers to one of the conditions within a conjunction. Referring to Example 1 above, "t.state='NY'" is a conjunct.

The term "disjunction" refers to two or more conditions connected by OR operators. As a purely illustrative example, consider the expression:

$$t.x<5 \text{ OR } t.\text{priority}=\text{'high'} \text{ OR } t.\text{state}=\text{'FL'} \quad (2)$$

The term "disjunct" (or "disjunctive condition") refers to one of the conditions within a disjunction. Referring to Example 2 above, "t.state='FL'" is a disjunct.

Conditions within either a conjunction or a disjunction may be simple conditions (as in both of the above examples), or they may be complex conditions as shown in Example 3 below.

$$t.x>7 \text{ AND}(t.\text{priority}=\text{'high'} \text{ OR } t.\text{state}=\text{'ME'}) \quad (3)$$

Example 3 includes a conjunction where the second conjunct is itself a disjunction. Similarly, in Example 4 shown below, the second conjunct is a disjunction, and the second disjunct within the disjunction is itself a conjunction.

$$t.x>7 \text{ AND}(t.\text{state}=\text{'GA'} \text{ OR}(t.\text{city}=\text{'Midland'} \text{ AND } t.\text{state}=\text{'TX'})) \quad (4)$$

The term "selectivity" refers to an estimate of the number of rows which will satisfy a condition, and is usually expressed as a percentage of total rows in a table.

INTRODUCTION

Figure 1:
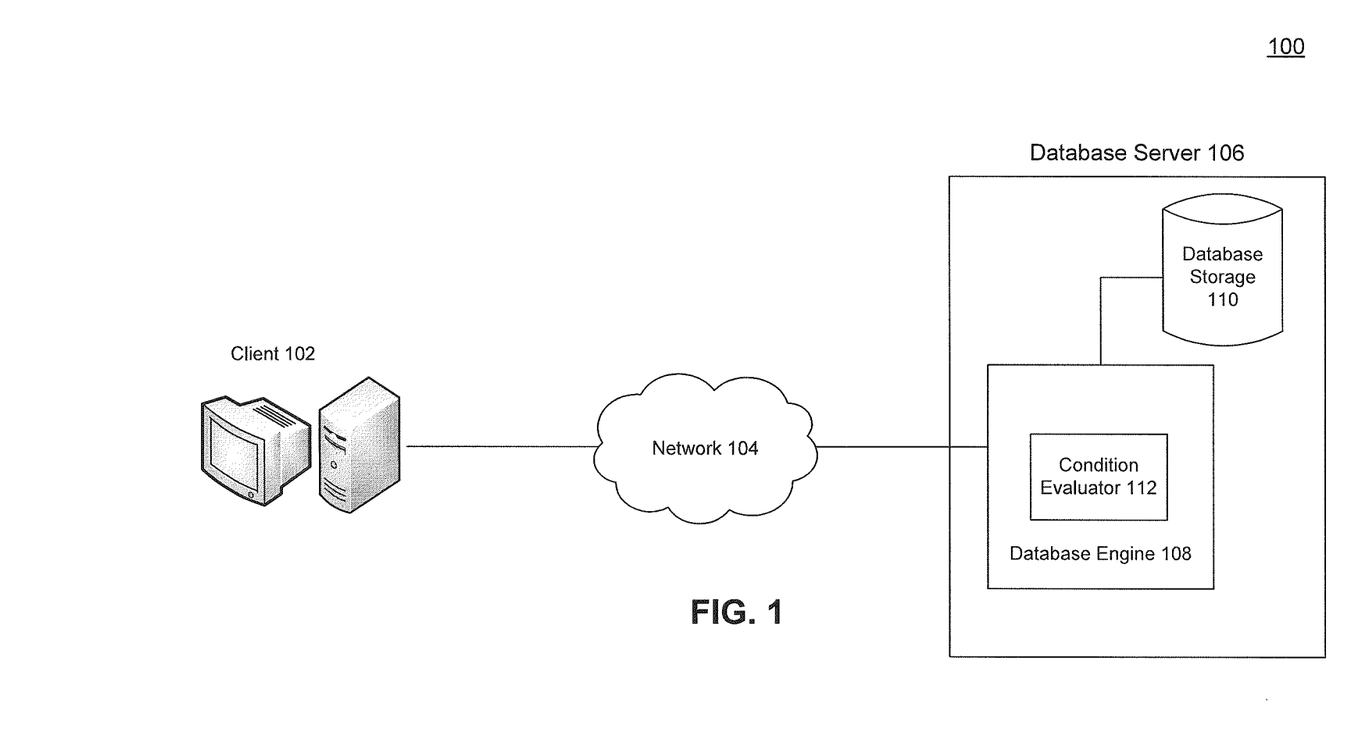
FIG. 1 illustrates a database network in which the present invention is implemented, in accordance with an embodiment of the present invention.

FIG. 1 depicts a database network 100 in which the present invention is implemented, in accordance with an embodiment of the present invention. The database network 100 includes a client system 102, a network 104, and a database server 106. The database server 106 includes a database engine 108 and database storage 110.

Client system 102 is operable to send a request for data, commonly in the form of a database query, to database server 106 over network 104. Database server 106 replies to the request by sending a set of results, commonly in the form of result rows from a database table, to client system 102 over network 104. One skilled in the relevant arts will appreciate that any data format operable to convey a request for data and a reply to the request may be used. In accordance with an embodiment of the present invention, the requests and replies are consistent with the conventions used in the Structured Query Language ("SQL"), although this example is provided solely for purposes of illustration and not limitation.

Network 104 is optionally either a public or private communications network. In accordance with an embodiment of the present invention, network 104 is the Internet. In accordance with an additional embodiment of the present invention, network 104 is a private intranet, such as a corporate network. Network 104 can be any other form of wired or wireless network.

When a request for data, such as a query, is received by database server 106, it is handled by database engine 108, in accordance with an embodiment of the present invention. Database engine 108 is operable to determine the data requested by the query, obtain the data, and provide a reply to the query. One skilled in the relevant arts will appreciate that while database engine 108 is illustrated as a single module in database network 100, database engine 108 may be implemented in a number of ways in order to accomplish the same function, including separating each of the aforementioned operations performed by database engine 108 into individual modules. Accordingly, the illustration of modules in database server 106 is not a limitation on the implementation of database server 106.

Database engine 108 is operable to obtain the data in response to the query from database storage 110, in accordance with an embodiment of the present invention. Database storage 110 stores values of a database in a data structure. In accordance with an embodiment of the present invention, database values are stored in a table data structure, the table having data rows and columns. At the intersection of each row and column is a data cell, the data cell having access to a data value corresponding to the associated row and column. Each column, in accordance with an embodiment of the present invention, has an associated data type, such as "string" or "integer," which is used by database engine 108 and client system 102 to interpret data contained in a data cell corresponding to the column. In accordance with an embodiment of the present invention, the database comprises multiple tables. In an embodiment, database engine 108 further includes condition evaluator 112. The operation of condition evaluator 112 is described further below.

Additionally, database storage 110 comprises alternate means of indexing data (e.g., bitmap) stored in a table of a database, in accordance with an embodiment of the present invention. Database engine 108 is operable to analyze a query to determine whether an available alternate means is useful to optimally access the data stored in a table, and then depending on the result of the analysis utilizes this alternate means to obtain data from the table, in accordance with an embodiment of the present invention. The present invention includes using such an alternate means of indexing data stored in a database table, although one skilled in the relevant arts will appreciate that alternate means of invoking the algorithms disclosed herein in order to access data within a database are within the scope of the present invention.

Overview of Bitmaps

Figure 2:
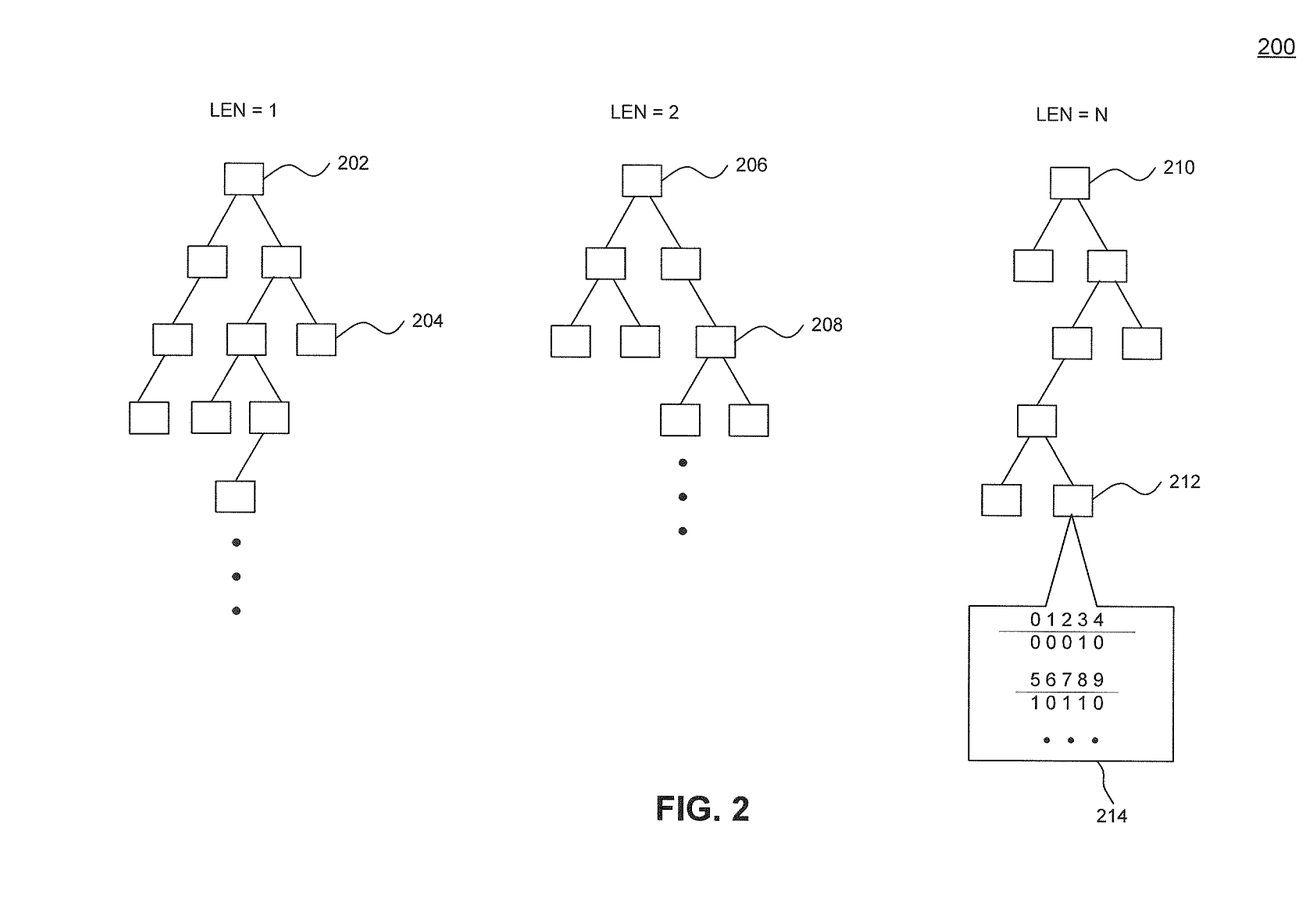
FIG. 2 illustrates a data structure used to provide an alternate means of indexing data in a database table, in accordance with an embodiment of the present invention.

FIG. 2 depicts a data structure 200 used to provide an alternate means of indexing data in a database table, in accordance with an embodiment of the present invention. Data structure 200 is depicted as a binary search tree ("BST"), but one skilled in the relevant arts will appreciate that the present invention is optionally implemented with the use of other types of tree structures, as well as other types of non-tree data structures.

Data structure 200 includes a number of individual trees, each originating from a separate root node, such as root nodes 202, 206, and 210. Each tree also has leaf nodes, such as nodes 204, 208, and 212. Data structure 200 is traversed by database engine 108, in accordance with an embodiment of the present invention, in order to locate a node corresponding to a data value in a query. Each node identifies rows in a database table for which a particular column of that row (i.e., a cell) contains the requested value. For example, if database engine 108 receives a query for all of the data in each row where the value of "column A" is LIKE "Sybase" in a table, database engine 108 is operable to retrieve a data structure, such as data structure 200, corresponding to "column A", and is then further operable to traverse the data structure in order to locate a node which contains the string "Sybase" somewhere in that column, in accordance with an embodiment of the present invention. The located node includes information identifying the specific rows in the table where the value of "column A" is LIKE "Sybase", thereby eliminating the need for database engine 108 to traverse each row of the table in order to compare the entries of "column A".

In accordance with an embodiment of the present invention, each node comprises a bitmap 214. The bitmap 214, an example of which is shown in FIG. 2, is an array of bits wherein each bit of the bitmap is associated with a row of a table. The individual bits of the bitmap are toggled between '0' and '1' to indicate whether or not a particular row satisfies the condition associated with the node in which bitmap 214 is located, in accordance with an embodiment of the present invention. For the purposes of example, a bit having a value of '0' is used to indicate that the node condition is not met for the associated row, and a bit having a value of '1' is used to indicate that the node condition is met for the associated row, but one skilled in the relevant arts will appreciate that the alternate condition or other convention may be used.

Each individual tree structure in the above example is generated by choosing a range of string lengths, such as 1 through 8, and generating nodes in the tree corresponding to each possible combination of strings of length 1 through 8 which occur in a particular data column associated with data structure 200. For example, root node 210 is the root of a tree where each node is associated with a string of length N. In the case where N is 8, a node, such as leaf node 212, is generated for each 8-character set occurring in every cell of the data column associated with data structure 200. Accordingly, in the case of two rows (and therefore two such cells in the associated column), where the first cell contains the text "the quick brown fox" and the second cell contains the text "jumped over the lazy dog", a node would be associated with each of the following strings:

"the quic"; "he quick"; "e quick "; "quick b"; "quick br"; "uick bro"; "ick brow"; "ck brown"; "k brown "; "brown f"; "brown fo"; "rown fox"; "jumped o"; "umped ov"; "mped ove"; "ped over"; "ed over "; "d over t"; "over th"; "over the"; "ver the"; "er the l"; "r the la"; "the laz"; "the lazy"; "he lazy "; "e lazy d"; "lazy do"; and "lazy dog".

As previously mentioned, each node contains a bitmap 214. In this example, the bitmap would comprise two bits, one for each row in the instant database table. The first 12 substrings above, each associated with the first string (i.e., "the quick brown fox") would each have a bitmap of '10' (where a '1' indicates association with a row) indicating that the substring can be found in the first row, but not in the second, in accordance with an embodiment of the present invention.

Returning to the previous example, if node 212 is associated with the condition whereby "column A" contains the string "Sybase" (either as the entire string or as a component thereof), then bitmap 214 indicates that rows 3, 5, 7, and 8 each contain the string "Sybase" within the cell associated with "column A", in accordance with an embodiment of the present invention. Accordingly, the query is rapidly resolved by returning only rows 3, 5, 7, and 8 as a result, without the need to retrieve and compare data in the remaining rows.

An example embodiment of bitmaps is provided in U.S. patent application Ser. No. 11/966,620 entitled, "System, Method and Computer Program Product For Accelerating Like Conditions," which is incorporated by reference herein in its entirety.

Condition Evaluator

In an embodiment, condition evaluator 112 can reduce the cost of evaluating an expensive simple condition (i.e., conditions which do not contain other conditions) which is enclosed within a disjunction within a bitmap-based environment. In an embodiment, such a cost reduction can be achieved using the following distinct methods. The first method (hereinafter "Method One") reduces the cost of evaluating expensive simple conditions within a disjunction where the entire disjunction is combined conjunctively with other selective conditions. The second method (hereinafter "Method Two") reduces the cost of evaluating expensive simple conditions within a disjunction where earlier disjunctive conditions were relatively non-selective.

Method One Optimization

In Method One, and according to an embodiment, each disjunctive condition (i.e., a set of conditions connected by one or more OR operators) may receive as an input a restriction bitmap. In an embodiment, a restriction bitmap represents a set of rows that have satisfied all conjunctive conditions (i.e., a set of conditions connected by one or more AND operators) which preceded the disjunction (i.e., OR operator) within a set of conjuncts. Method One leverages knowledge that any rows which have not satisfied the preceding conjunctive conditions may not affect the final set of rows which must be delivered after the result of a disjunction has been combined conjunctively with results from preceding conjunctive conditions. When the cost of computing a simple condition within a disjunction is expected to be large, then restricting the scope of that simple condition's evaluation to the set of rows within the restriction bitmap can dramatically reduce the cost of evaluating that simple condition. In this way, Method One implemented by condition evaluator 112, can achieve significant cost savings associated with query processing.

In an embodiment, as Method One can typically require at least one additional bitmap operation to make use of the restriction bitmap, condition evaluator 112 can estimate the cost savings and compare the cost savings against the modest extra cost of an additional bitmap operation before deciding whether to apply Method One. Therefore, in an embodiment, each of the disjunctive conditions are independently considered by condition evaluator 112 to determine whether the savings for a disjunctive condition justify the use of Method One for that condition, based on the condition, the available indexes, and the contents of the incoming restriction bitmap.

In an embodiment, condition evaluator 112 also keeps track of the number of disjunctive conditions within a disjunct set that have applied Method One. If all of the disjunctive conditions used Method One, then the final disjunctive result is also the result of a conjunction of the disjunction with earlier conjuncts. If not all of the disjuncts applied this method, then the final disjunctive result is intersected by condition evaluator 112 with the restriction bitmap to produce a conjunction of the disjunction with the earlier conjuncts.

Consider the following example that includes the WHERE clause:

WHERE stock.symbol='IBM'

AND(stock.gross_price>=10000.0

OR stock.num_shares>=1000)

In this example, the condition on stock.symbol (i.e., stock.symbol='IBM') is the conjunctive condition which precedes the disjunction (i.e., OR). Let us assume that the condition on stock.symbol is satisfied by 0.1% of the rows in the 'stock' table (i.e., 99.9% of the rows are rejected by this condition). Thus, in an embodiment, using Method One, database engine 108 can generate a restriction bitmap which represents 0.1% of the rows in the table or the rows that satisfy the condition "stock.symbol='IBM'". Let us also assume that the only index available on stock.gross_price is a column-store (or any other data-structure that naturally stores content by column rather than by row). To evaluate the condition on stock.gross_price using conventional methods, it would require that the entire column-store be projected and that this condition (i.e., stock.symbol='IBM') be evaluated on each cell in the column. However, with Method One and its restriction bitmap, this condition need only be evaluated against 0.1% of the cells in the column, thereby reducing the number of cells projected, condition evaluations, and their corresponding total costs by a significant factor (e.g., a factor of 1000). In some cases, depending on the distribution of the bits within the restriction bitmap, Method One may also reduce the number of pages from the column-store that will need to be read to project all the necessary cells. Such a reduction in the number of pages read can result in further cost savings.

In an embodiment, not intended to limit the invention, the following exemplary conditions must be satisfied to apply Method One discussed above.

(a) A query with a set of conditions against a database table that can each be evaluated using bitmap-based methods.

(b) At least one disjunction included within the set of conditions of (a).

(c) The disjunction of (b) combined conjunctively with at least one other condition.

In this way, Method One allows condition evaluator 112 to leverage a bitmap representing a result of preceding conjunctive condition(s) to reduce a cost of evaluating a condition within the disjunction. Such cost reduction is achieved by ignoring rows not represented within the bitmap. Furthermore, condition evaluator 112 can make a cost-based decision on whether to apply Method One to each disjunct. In addition, condition evaluator 112 can avoid a final conjunction computation if all disjuncts applied Method One.

Figure 3:
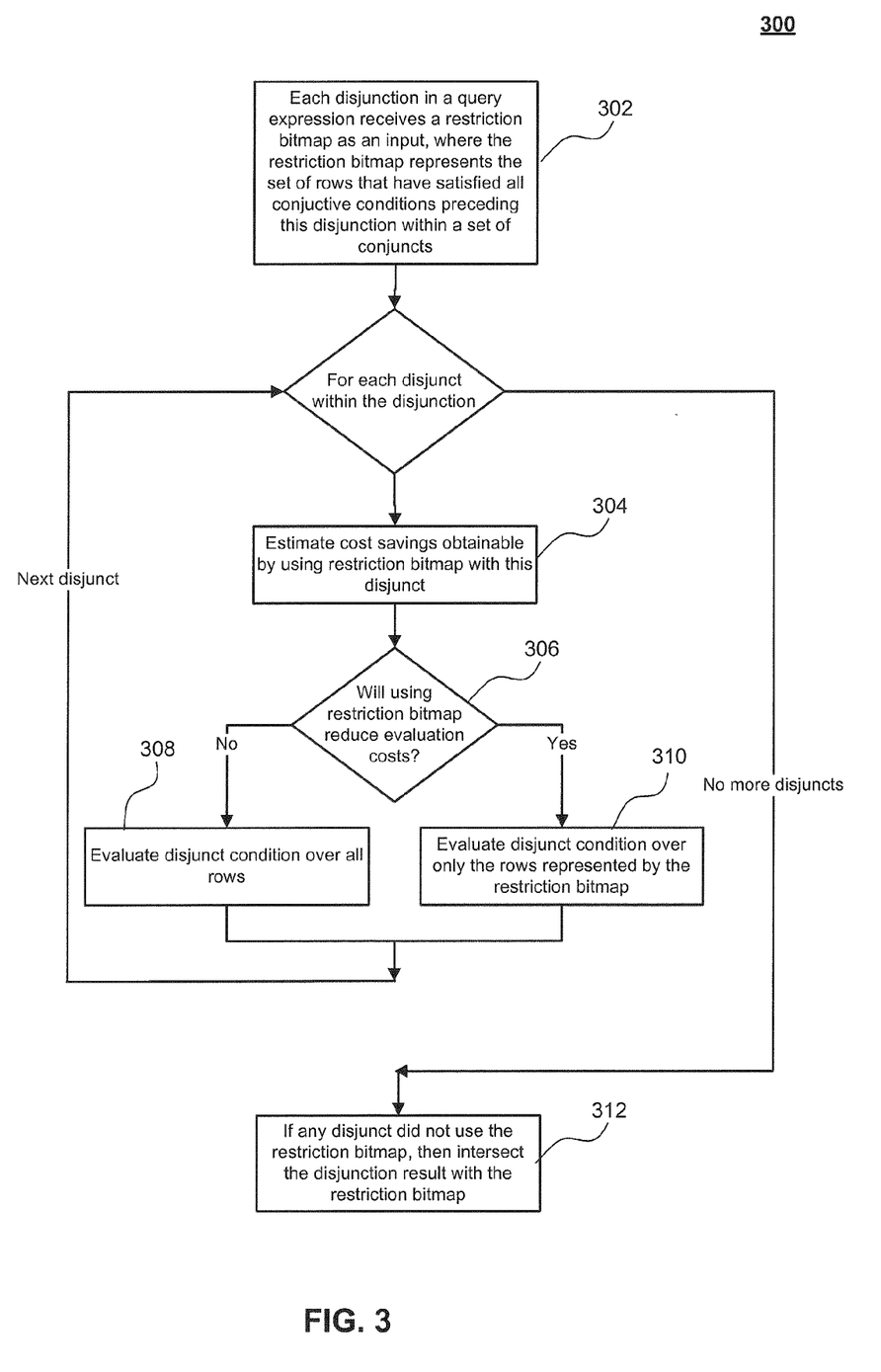
FIG. 3 is a flowchart illustrating an exemplary operation of a condition evaluator, in accordance with an embodiment of the present invention.

FIG. 3 is a flowchart illustrating an exemplary overall operation of condition evaluator 112 in accordance with Method One optimization, and according to an embodiment.

In step 302, each disjunction in a query expression receives a restriction bitmap as an input, where the restriction bitmap represents the set of rows that have satisfied all conjunctive conditions preceding a disjunction within a set of conjuncts.

For each disjunct within the disjunction, condition evaluator 112 estimates cost savings obtainable by using the restriction bitmap for a disjunct (step 304).

In step 306, condition evaluator 112 determines if use of the restriction bitmap reduces evaluation costs. If use of the restriction bitmap reduces evaluation costs (step 306), condition evaluator 112 evaluates the disjunct condition over only the rows represented by the restriction bitmap (step 310). If use of the restriction bitmap does not reduce evaluation costs, condition evaluator 112 evaluates the disjunct condition over all rows (step 308). Condition evaluator 112 selects the next disjunct for evaluation after step 308 or step 310 is performed, and method 300 proceeds to step 304.

If condition evaluator 112 determines that no more disjuncts are to be evaluated, and if any disjunct did not use the restriction bitmap, condition evaluator 112 intersects the disjunction result with the restriction bitmap (step 312).

Method Two Optimization

In Method Two, conditions within a disjunction (regardless of whether the disjunctive set of conditions is enclosed within a conjunction) may be optimized by condition evaluator 112 by leveraging the results of preceding bitmap-based disjunctive conditions. After a first disjunctive condition has been evaluated, then logically the result of the disjunction as a whole may not be affected by whether a subsequent disjunct was also satisfied by some of the same rows as those satisfied by the first disjunct. This principle can be generalized to state that for any given disjunct its evaluation for rows that have already been satisfied by some preceding disjunct may not be relevant. Thus, in an embodiment, condition evaluator 112 can avoid evaluations for such rows. In an embodiment, a disjunction can be evaluated faster under some conditions if it is recognized by condition evaluator 112 that all the rows already represented in incoming disjunctive found set do not need to be evaluated for a current local disjunctive condition.

To implement Method Two, each disjunct may receive a bitmap representing the result of all preceding disjuncts. When supplied, a current disjunct may choose to restrict its own evaluation, using condition evaluator 112, to the set of rows within the table that are not also within that incoming disjunctive result bitmap. Since applying Method Two may require a few bitmap operations, the cost of those operations is compared by condition evaluator 112 against the estimated cost benefits of applying Method Two to determine whether the method should be applied. In an embodiment, this cost-based decision is made independently by condition evaluator 112 for each disjunct based on the condition, the available indexes, and the contents of the incoming disjunctive bitmap. In an embodiment, condition evaluator 112 may increase the efficiency of Method Two by reordering the disjuncts in order by descending selectivity, thereby causing the least selective disjunct to be evaluated first.

Consider the following example that includes a WHERE clause:

WHERE(stock.gross_price>=10000.0

OR stock.num_shares>=1000)

In this example, there are two disjunctive conditions, but no enclosing conjunction. Let us assume that the condition on stock.gross_price is satisfied by 90.0% of the rows in the 'stock' table (i.e., 10.0% of the rows are rejected by this condition). So for Method Two, when database engine 108 is to evaluate the second disjunct, it has an incoming disjunctive bitmap which represents 90.0% of the rows in the table. Let us also assume that the only index available on stock.num_shares is a column-store. To evaluate this condition on stock.num_shares, conventional methods would require that the entire column-store be projected and that this condition be evaluated on each cell in the column. However, using Method Two and its incoming disjunctive bitmap, this condition need only be evaluated against 10.0% of the cells in the column, thereby reducing the number of cells projected, condition evaluations, and their corresponding total costs by a factor of 10.

In some cases, depending on the distribution of the bits within the restriction bitmap, Method Two may also reduce the number of pages from the column-store that will need to be read to project all the necessary cells. In an embodiment, Method Two allows a cost-based decision by condition evaluator 112 on whether to apply this method and the restriction bitmap to each disjunctive condition. In an embodiment, Method Two also allows and reordering of a set of disjunctive conditions to place a less selective disjunctive condition such that it will be evaluated before a more selective disjunctive condition.

In this way, Method Two can leverage a bitmap representing the result of the preceding disjunctive condition(s) to reduce the cost of evaluating a condition within the disjunction.

In an embodiment, not intended to limit the invention, the following exemplary conditions must be satisfied to apply Method Two discussed above.

(a) A query with a set of conditions against a table that can each be evaluated using bitmap-based methods.

(b) At least one disjunction is included in the set of conditions of (a).

Figure 4:
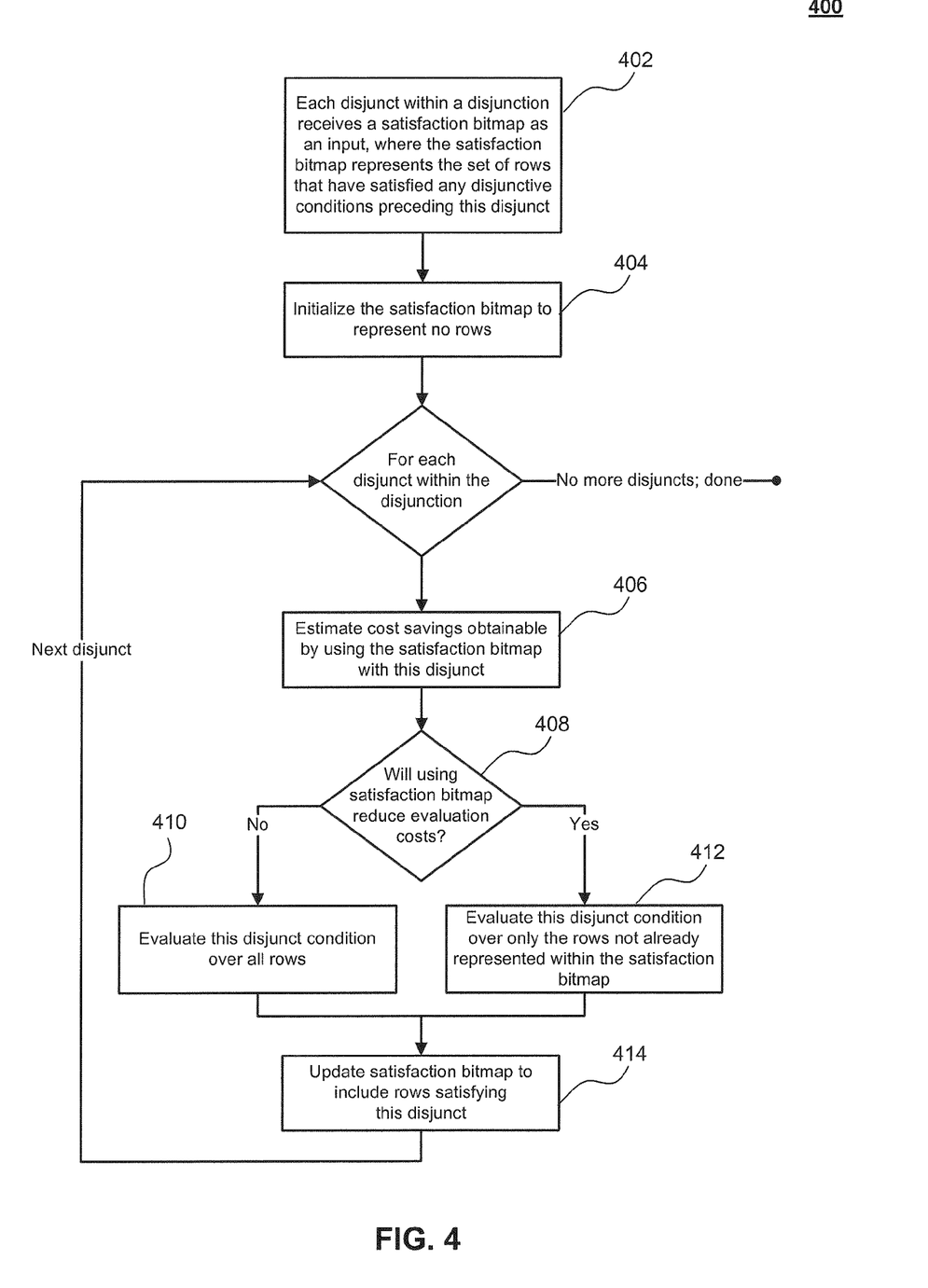
FIG. 4 is a flowchart illustrating an exemplary operation of a condition evaluator, in accordance with another embodiment of the present invention.

FIG. 4 is a flowchart illustrating an exemplary overall operation of condition evaluator 112 in accordance with Method Two optimization, and according to an embodiment.

In step 402, each disjunct within a disjunction receives a satisfaction bitmap as an input, where the satisfaction bitmap represents the set of rows that have satisfied any disjunctive conditions preceding a disjunct.

In step 404, the satisfaction bitmap is initialized to represent no rows. For each disjunct within the disjunction, condition evaluator 112 estimates cost savings obtainable by using the satisfaction bitmap with the disjunct (step 406).

In step 408, condition evaluator 112 determines if use of the satisfaction bitmap reduces evaluation costs. If use of the satisfaction bitmap reduces evaluation costs (step 408), condition evaluator 112 evaluates the disjunct condition over only the rows not already represented within the satisfaction bitmap (step 412). If use of the satisfaction bitmap does not reduce evaluation costs (step 408), condition evaluator 112 evaluates the disjunct condition over all rows (step 410). Condition evaluator 112 updates the satisfaction bitmap to include rows satisfying the disjunct (step 414) after either steps 410 or 412 are performed. Condition evaluator 112 selects the next disjunct in the disjunction for evaluation after step 414 is performed and method 400 ends when condition evaluator 112 has evaluated all disjuncts within the disjunction.

Combining Method One and Method Two Optimization

As discussed above, Method Two optimization does not require enclosing conjunctive conditions to be present with the disjunction. However, in an embodiment, Method One optimization does require enclosing conjunctive conditions to be present with the disjunction. For any set of disjunctive conditions where Method One can be applied, then Method Two could also potentially be applied to every disjunctive condition after the first disjunctive condition. Thus, in an embodiment, condition evaluator 112 can use Method One and Method Two optimization in combination for many queries.

When applying both methods together, condition evaluator 112 leverages both a bitmap representing the result of preceding disjunctive conditions and a bitmap representing the result of the preceding conjunctive conditions by evaluating a disjunctive condition against rows that are present within the restriction bitmap and are not present within the incoming disjunctive bitmap.

For example, returning to the example SQL code discussed for Method One, the condition on num_shares is eligible to have both Method One and Method Two applied.

In this way, embodiments of the present invention enable acceleration of queries containing disjunctions of conditions on a table using a combination of Method One and Method Two optimization.

Figure 5:
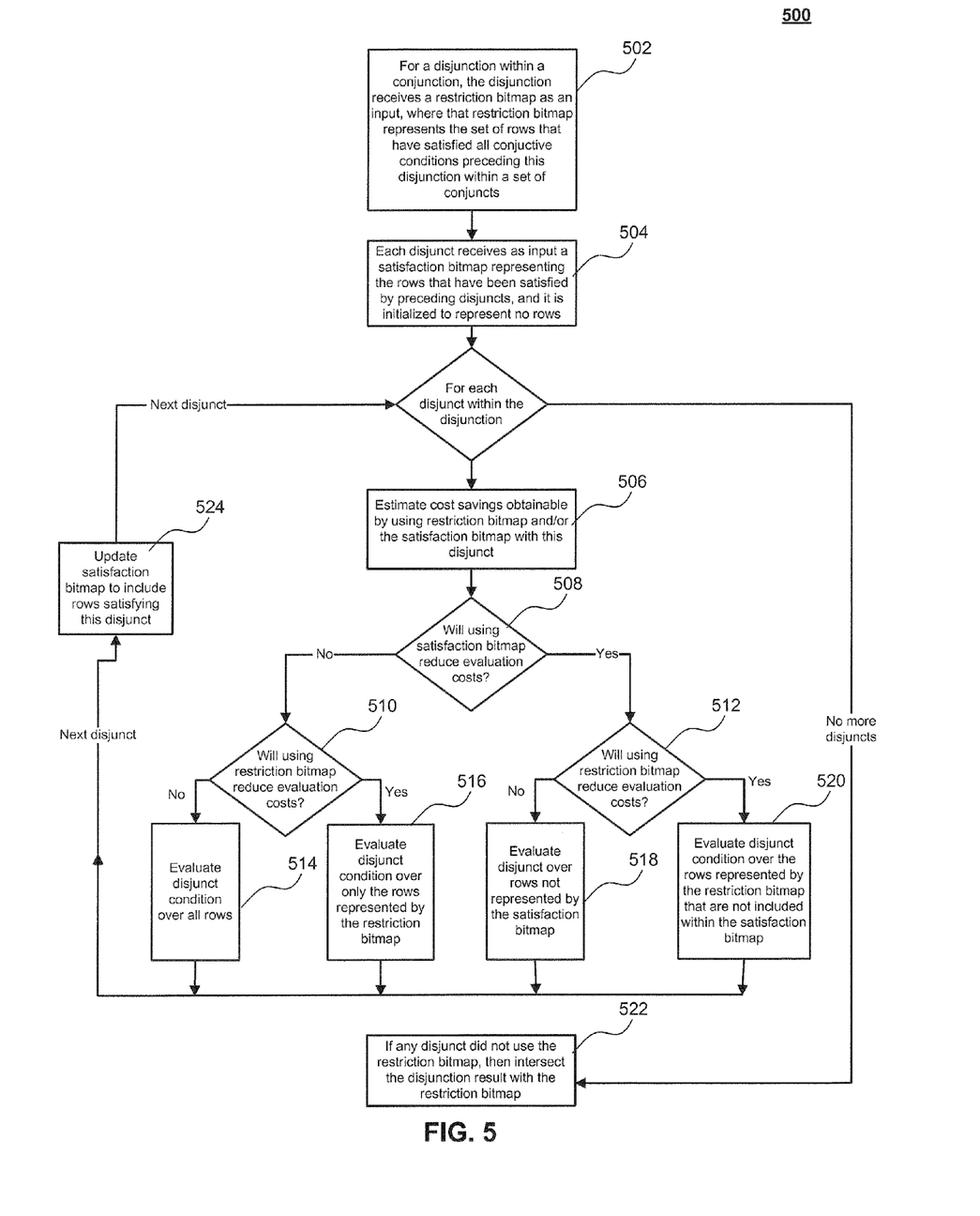
FIG. 5 is a flowchart illustrating an exemplary operation of a condition evaluator, in accordance with yet another embodiment of the present invention.

FIG. 5 is a flowchart illustrating an exemplary overall operation of condition evaluator 112 that uses Method One and Method Two optimization in combination, according to an embodiment.

In step 502, for a disjunction within a conjunction, the disjunction receives a restriction bitmap as an input, where that restriction bitmap represents the set of rows that have satisfied all conjunctive conditions preceding the disjunction within a set of conjuncts.

In step 504, each disjunct receives as input a satisfaction bitmap representing the rows that have been satisfied by preceding disjuncts and it is initialized to represent no rows.

For each disjunct within the disjunction, condition evaluator 112 estimates cost savings obtainable by using restriction bitmap and/or the satisfaction bitmap with this disjunct (step 506).

In step 508, condition evaluator 112 checks if use of the satisfaction bitmap reduces evaluation costs. If use of the satisfaction bitmap reduces evaluation costs (step 508), condition evaluator 112 checks if use of the restriction bitmap reduces evaluation costs (step 512). If use of the restriction bitmap reduces evaluation costs (step 512), condition evaluator 112 evaluates the disjunct condition over the rows represented by the restriction bitmap that are not included within the satisfaction bitmap (step 520). Returning to step 512, if use of the restriction bitmap does not reduce evaluation costs, condition evaluator 112 evaluates the disjunct over rows not represented by the satisfaction bitmap (step 518). Returning to step 508, if use of the satisfaction bitmap does not reduce evaluation costs, condition evaluator 112 checks if use of the restriction bitmap reduces evaluation costs (step 510). If use of the restriction bitmap reduces evaluation costs (step 510), condition evaluator 112 evaluates the disjunct condition over only the rows represented by the restriction bitmap (step 516). If use of the restriction bitmap does not reduce evaluation costs (step 510), condition evaluator 112 evaluates the disjunct condition over all rows (step 514). After any one of steps 514, 516, 518 or 520 is performed, condition evaluator 112 proceeds to select the next disjunct within the disjunction for evaluation and also updates the satisfaction bitmap to include rows satisfying this selected disjunct (step 524). Once all disjuncts within the disjunction have been evaluated, and if any disjunct did not use the restriction bitmap, condition evaluator 112 intersects the disjunction result with the restriction bitmap (step 522).

Example Computer Embodiment

Figure 6:
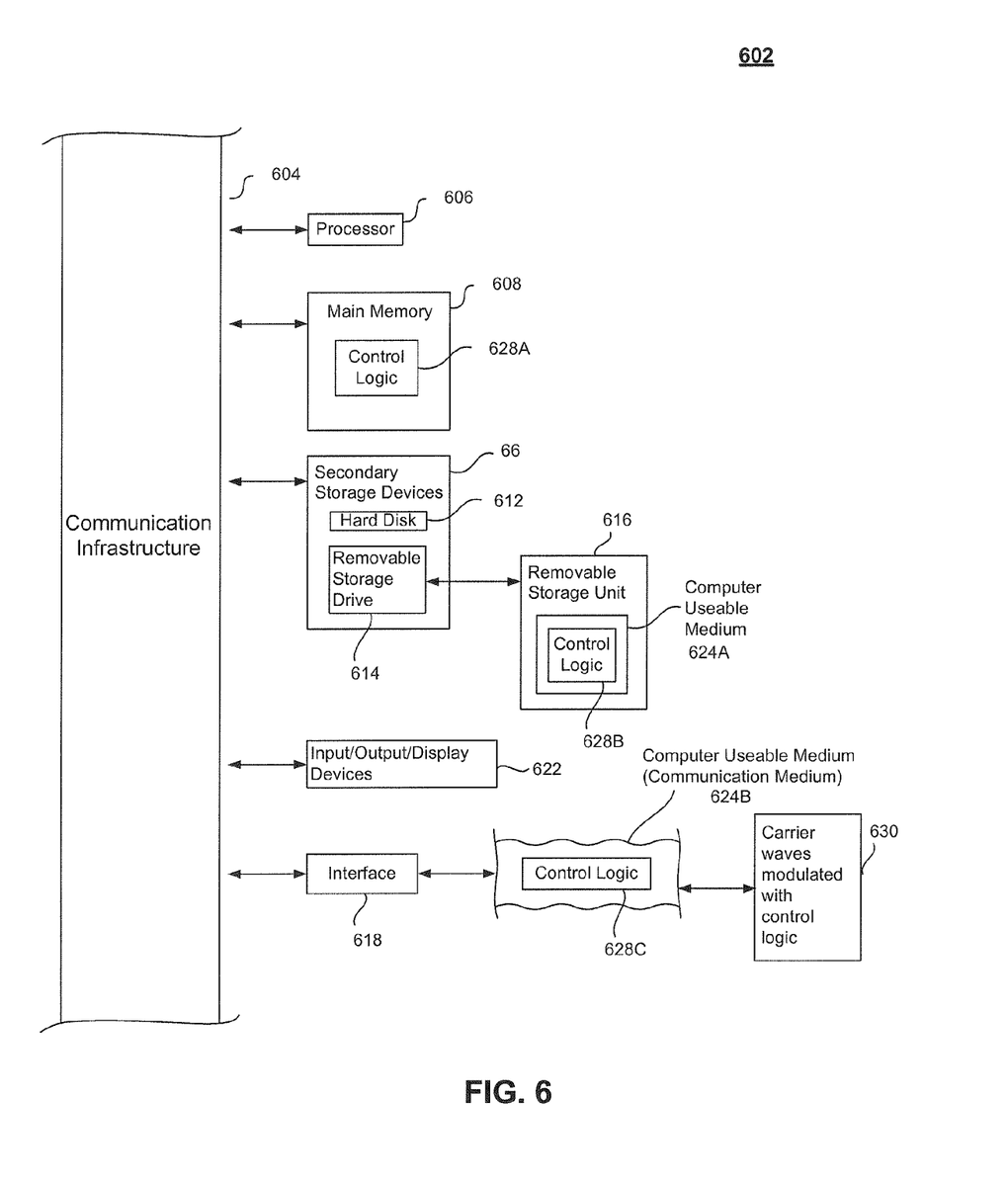
FIG. 6 depicts an example computer system in which embodiments of the present invention may be implemented.

In an embodiment of the present invention, the system and components of embodiments described herein are implemented using well known computers, such as computer 602 shown in FIG. 6. For example, database engine 108 or condition evaluator 112 can be implemented using computer(s) 602.

The computer 602 can be any commercially available and well known computer capable of performing the functions described herein, such as computers available from International Business Machines, Apple, Sun, HP, Dell, Compaq, Digital, Cray, etc.

The computer 602 includes one or more processors (also called central processing units, or CPUs), such as a processor 606. The processor 606 is connected to a communication bus 604.

The computer 602 also includes a main or primary memory 608, such as random access memory (RAM). The primary memory 608 has stored therein control logic 628A (computer software), and data.

The computer 602 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624 having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well known manner.

The computer 602 also includes input/output/display devices 622, such as monitors, keyboards, pointing devices, etc.

The computer 602 further includes a communication or network interface 618. The network interface 618 enables the computer 602 to communicate with remote devices. For example, the network interface 618 allows the computer 602 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from the computer 602 via the communication medium 624B. More particularly, the computer 602 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method, comprising:
determining, by at least one processor, a presence of a disjunction expression in a complex query expression, the disjunction expression including a disjunctive operator and a plurality of disjunctive conditions, wherein the complex query expression comprises a conjunction expression including a conjunction operator, the disjunction expression, and one or more conjunctive conditions that precede the disjunction expression;
receiving, in response to the determining, by the at least one processor, a restriction bitmap for each disjunction expression in the complex query expression, the restriction bitmap representing a set of rows that have satisfied the one or more preceding conjunctive conditions, wherein a bit from the restriction bitmap represents whether a respective row has satisfied the one or more preceding conjunctive conditions;
determining whether respective cost savings justify restricting evaluation of each disjunctive condition from the plurality of disjunctive conditions using the restriction bitmap;
responsive to determining that a disjunctive condition from the plurality of disjunctive conditions has a respective cost saving that justifies restricting evaluation, restricting, by the at least one processor, evaluation of the disjunctive condition from the plurality of disjunctive conditions to the set of rows represented by the restriction bitmap; and
providing, by the at least one processor, a bitmap result of evaluating the disjunction expression, the bitmap result determined, in part, using the restricted evaluation of the disjunctive condition.

2. The method of claim 1, further comprising:
comparing said cost savings against a cost of additional bitmap operations before performing said restricting.

3. The method of claim 1, further comprising:
if not all disjunctive conditions from the plurality of disjunctive conditions used said restricting, producing a final bitmap result for a conjunction of the disjunction expression and the one or more preceding conjunctive conditions by intersecting the bitmap result of the disjunction expression with the restriction bitmap.

4. The method of claim 1, further comprising
reordering conjunctive conditions in the conjunction expression by placing conjunctive conditions that are disjunctions after conjunctive conditions that are not disjunctions.

5. A computer implemented method, comprising:
determining, by at least one processor, a presence of a disjunction expression in a complex query expression, the disjunction expression including a disjunctive operator, a disjunctive condition, and one or more disjunctive conditions that precede the disjunctive condition in the complex query expression;
receiving, in response to the determining, by the at least one processor, a satisfaction bitmap that represents a set of rows that have satisfied the one or more preceding disjunctive conditions, wherein a bit from the satisfaction bitmap represents whether a respective row has satisfied the one or more preceding disjunctive conditions;
determining whether respective cost savings justify restricting evaluation of each disjunctive condition within the disjunction expression using the satisfaction bitmap;
responsive to determining that the disjunctive condition has a respective cost saving that justifies restricting evaluation, restricting, by the at least one processor, scope of evaluation of the disjunctive condition to a set of rows that are not within the satisfaction bitmap; and
providing, by the at least one processor, a bitmap result of evaluating the disjunction expression, the final result determined, in part, using the restricted evaluation of the disjunctive condition.

6. The method of claim 5, further comprising:
reordering, based on selectivities of respective disjunction conditions, disjunctive conditions in the disjunction expression from the least selective disjunctive condition to the most selective condition; and
evaluating the reordered disjunctive conditions.

7. A computer-based system, comprising:
a memory configured to store modules comprising:
a first module configured to determine a presence of a disjunction expression in a complex query expression, the disjunction expression including a disjunctive operator and a plurality of disjunctive conditions, wherein the complex query expression comprises a conjunction expression including a conjunction operator, the disjunction expression, and one or more additional conjunctive conditions that precede the disjunction expression;
a second module configured to receive, in response to the determining, a restriction bitmap for each disjunction expression in the complex query expression, the restriction bitmap representing a set of rows that have satisfied the one or more preceding conjunctive conditions, wherein a bit from the restriction bitmap represents whether a respective row has satisfied the one or more preceding conjunctive conditions; and a third optimization module configured to:
determine whether respective cost savings justify restricting evaluation of each disjunctive condition from the plurality of disjunctive conditions using the restriction bitmap,
responsive to determining that a disjunctive condition from the plurality of disjunctive conditions has a respective cost saving that justifies restricting evaluation, restrict evaluation of the disjunctive condition to said set of rows represented by said restriction bitmap, and
provide a bitmap result of evaluating the disjunction expression, the bitmap result determined, in part, using the restricted evaluation of the disjunctive condition; and
at least one processor configured to process the first, second, and third modules.

8. A non-transitory computer-readable storage device having instructions stored thereon, execution of which by a computing device, cause said computing device to perform operations comprising:
determining, by at least one processor, a presence of a disjunction expression in a complex query expression, the disjunction expression including a disjunctive operator and a plurality of disjunctive conditions, wherein the complex query expression comprises a conjunction expression including a conjunction operator, the disjunction expression, and one or more conjunctive conditions that precede the disjunction expression;
receiving, in response to the determining, by the at least one processor, a restriction bitmap for each disjunction expression in the complex query expression, the restriction bitmap representing a set of rows that have satisfied the one or more preceding conjunctive conditions, wherein a bit from the restriction bitmap represents whether a respective row has satisfied the one or more preceding conjunctive conditions;
determining whether respective cost savings justify restricting evaluation of each disjunctive condition from the plurality of disjunctive conditions using the restriction bitmap;
responsive to determining that a disjunctive condition from the plurality of disjunctive conditions has a respective cost saving that justifies restricting evaluation, restricting, by the at least one processor, evaluation of the disjunctive condition to the set of rows represented by the restriction bitmap; and
providing, by the at least one processor, a bitmap result of evaluating the disjunction expression, the bitmap result determined, in part, using the restricted evaluation of the disjunctive condition.

9. The non-transitory computer-readable storage device of claim 8, said operations further comprising:
comparing said cost savings against a cost of additional bitmap operations before performing said restricting.

10. The non-transitory computer-readable storage device of claim 8, said operations further comprising:
if not all disjunctive conditions from the plurality of disjunctive conditions used said restricting, producing a final bitmap result for a conjunction of the disjunction expression and the one or more preceding conjunctive conditions by intersecting the bitmap result of the disjunction expression with the restriction bitmap.

11. The non-transitory computer-readable storage device of claim 8, said operations further comprising:
- reordering conjunctive conditions in the conjunction expression by placing conjunctive conditions that are disjunctions after conjunctive conditions that are not disjunctions.

12. A non-transitory computer-readable storage device having instructions stored thereon, execution of which by a computing device, cause said computing device to perform operations comprising:
- determining a presence of a disjunction expression in a query expression, the disjunction expression including a disjunctive operator, a disjunctive condition, and one or more disjunctive conditions that precede the disjunctive condition in the complex query expression;
- receiving, in response to the determining, a satisfaction bitmap that represents a set of rows that have satisfied the one or more preceding disjunctive conditions, wherein a bit from the satisfaction bitmap represents whether a respective row has satisfied the one or more preceding disjunctive conditions;
- determining whether respective cost savings justify restricting evaluation of each disjunctive condition within the disjunction expression using the satisfaction bitmap;
- responsive to determining that the disjunctive condition has a respective cost saving that justifies restricting evaluation, restricting scope of evaluation of the disjunctive condition to a set of rows that are not within the satisfaction bitmap; and
- providing, by the at least one processor, a bitmap result of evaluating the disjunction expression, the bitmap result determined, in part, using the restricted evaluation of the disjunctive condition.

13. The non-transitory computer-readable storage device of claim 12, said operations further comprising:
- reordering, based on selectivities of respective disjunction conditions, the disjunctive conditions in the disjunction expression from the least selective disjunctive condition to the most selective condition; and
- evaluating the reordered disjunctive conditions.

14. A non-transitory computer-readable storage device having instructions stored thereon, execution of which by a computing device, cause said computing device to perform operations comprising:
- determining a presence of a disjunction expression in a complex query expression, the disjunction expression including a disjunctive operator, a disjunctive condition, and one or more disjunctive conditions that precede the disjunctive condition, wherein the complex query expression comprises a conjunction expression including a conjunction operator, the disjunction expression, and one or more conjunctive conditions that precede the disjunction expression;
- receiving, in response to the determining, a restriction bitmap for the disjunction expression in the complex query expression, the restriction bitmap representing a set of rows that have satisfied the one or more preceding conjunctive conditions, wherein a bit from the restriction bitmap represents whether a respective row has satisfied the one or more preceding conjunctive conditions;
- receiving, in response to the determining, a satisfaction bitmap for each disjunctive condition of the disjunction expression, the satisfaction bitmap representing a set of rows that have satisfied the one or more preceding disjunctive conditions in said disjunction, wherein a bit from the satisfaction bitmap represents whether a respective row has satisfied the one or more preceding disjunctive conditions;
- determining whether respective cost savings justify restricting evaluation of each disjunctive condition within the disjunctive expression using the satisfaction bitmap and the restriction bitmap;
- responsive to determining that the disjunctive condition has a respective cost saving that justifies restricting evaluation, restricting, evaluation of the disjunctive condition to a set of rows that are within the restriction bitmap and not within the satisfaction bitmap; and
- providing a bitmap result of evaluating the disjunction expression, the bitmap result determined, in part, using the restricted evaluation of the disjunctive condition.

* * * * *